United States Patent [19]

Matthews et al.

[11] 4,339,066
[45] Jul. 13, 1982

[54] ULTRASONIC DIP SOLDERING PROCESS

[75] Inventors: Gerald N. Matthews; Frank H. Sanders, both of Tyler, Tex.

[73] Assignee: General Electric Company, Louisville, Ky.

[21] Appl. No.: 137,709

[22] Filed: Apr. 7, 1980

[51] Int. Cl.³ .......................... B23K 1/06; B23K 1/08
[52] U.S. Cl. ..................................... 228/183; 228/262
[58] Field of Search ....................... 228/183, 259, 262

[56] References Cited

U.S. PATENT DOCUMENTS

| | | | |
|---|---|---|---|
| 3,752,381 | 8/1973 | Watson, Jr. ................. | 228/262 X |
| 3,760,481 | 9/1973 | Greever ...................... | 228/36 X |
| 3,833,986 | 9/1974 | DeCicco ..................... | 228/183 X |
| 3,920,176 | 11/1975 | Becker et al. .............. | 228/183 |
| 4,076,167 | 2/1978 | Wright ........................ | 228/183 X |
| 4,186,474 | 2/1980 | Hine ............................ | 228/183 X |
| 4,256,252 | 3/1981 | Huppunen et al. ......... | 228/36 X |

FOREIGN PATENT DOCUMENTS 51-20741  2/1976  Japan ................................ 228/183

Primary Examiner—Gus T. Hampilos
Assistant Examiner—J. Reed Batten, Jr.
Attorney, Agent, or Firm—Frank P. Giacalone; Radford M. Reams

[57] ABSTRACT

Apparatus and method of venting a plate fin coil during the ultrasonic soldering of aluminum return bend tubes to the heat exchange tubes in the coil. The apparatus includes a snorkel member arranged on the heat exchanger carrying mechanism whereby one end of the snorkel is telescoped in the open end of a heat exchange tube forming an end of a circuit in the coil, with the other end communicating with the atmosphere, whereby pressure in the interior of the circuit is relieved when the coil is immersed in the solder bath.

8 Claims, 6 Drawing Figures

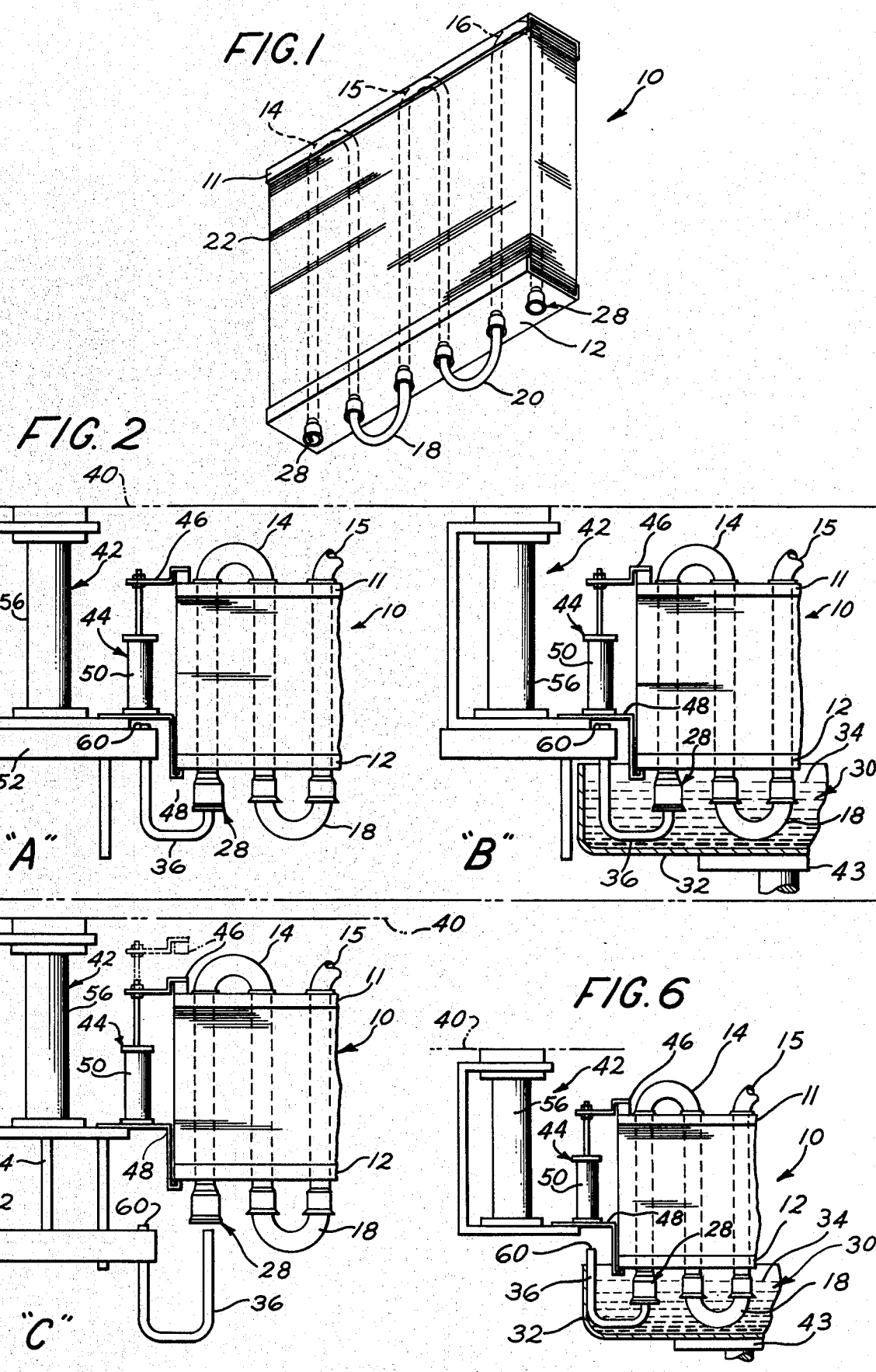

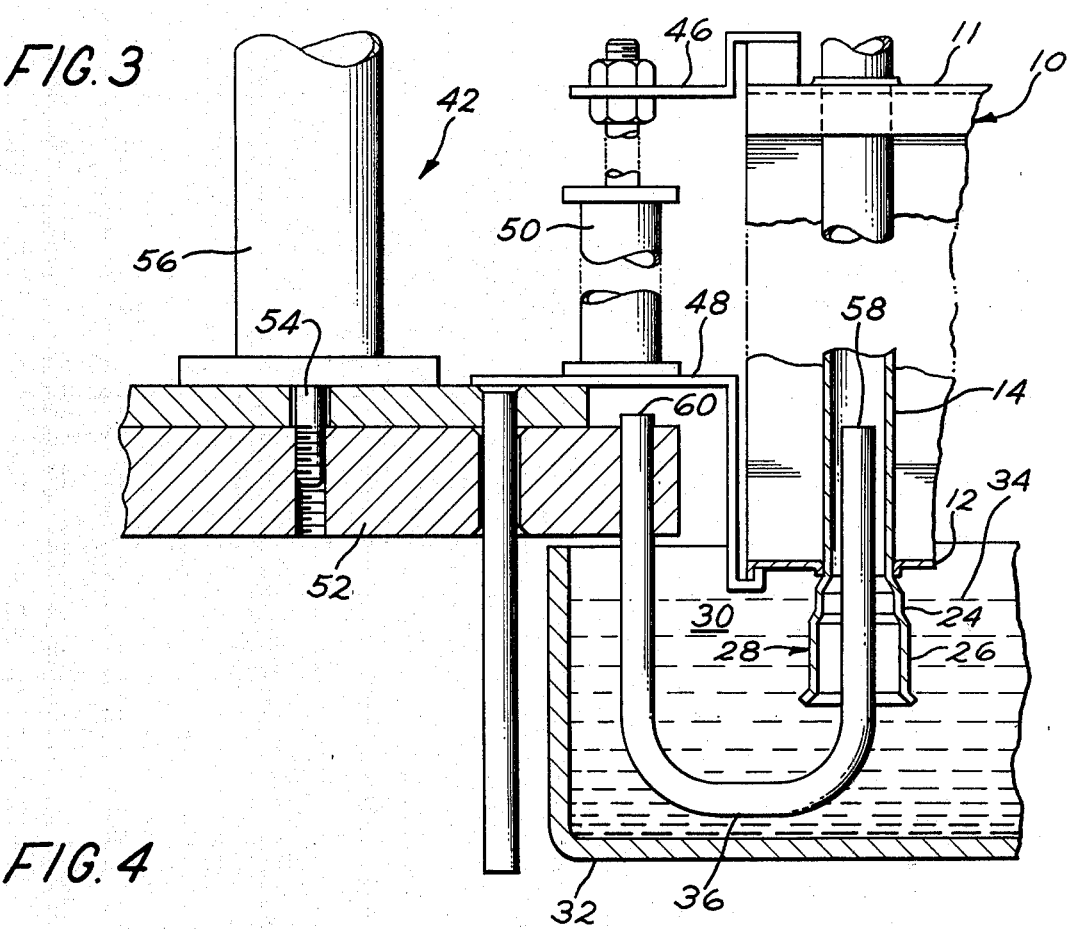
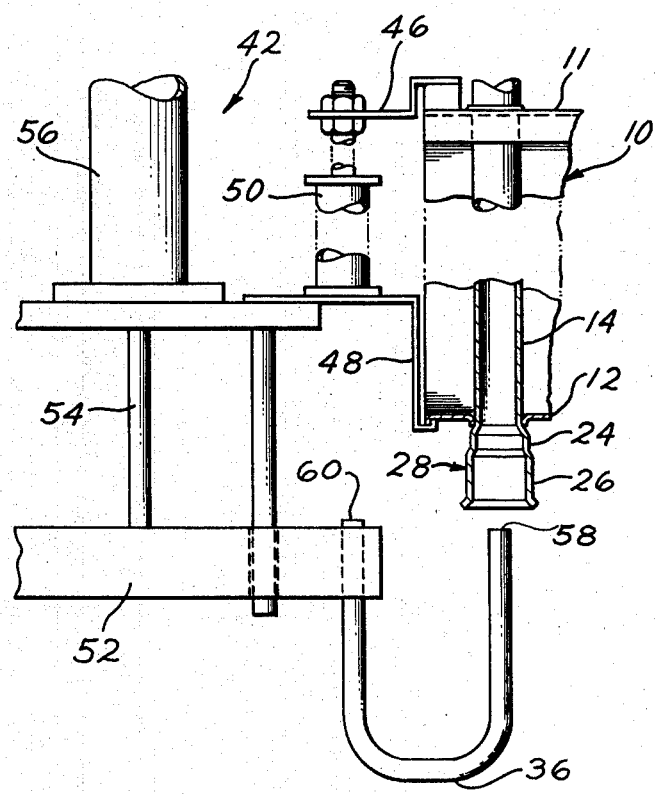
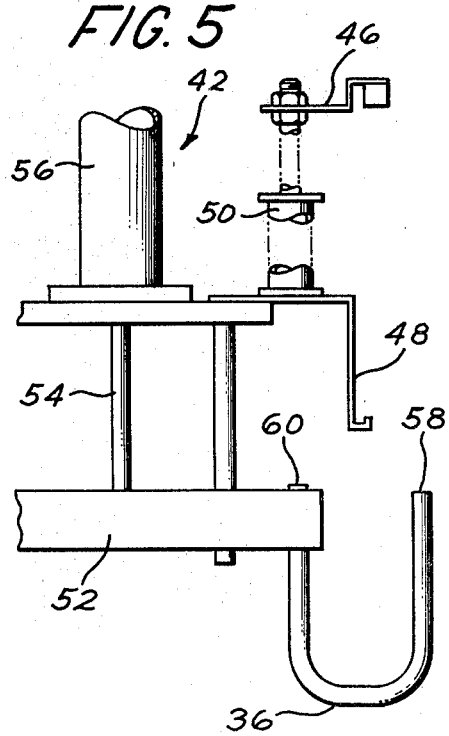

ULTRASONIC DIP SOLDERING PROCESS

BACKGROUND OF THE INVENTION

The present invention relates to the fabrication of plate fin heat exchange coils and, in particular, to the ultrasonic soldering of return bends to straight heat exchange tubes to form one or more circuits in a plate fin coil.

A type of heat exchange apparatus widely used in heating and cooling air conditioning systems comprises a plurality of thin-walled straight tubes extending perpendicularly through a large number of parallel thin fins. The tubes are mounted in place by means of rigid end plates parallel with the fins and forming the opposite end walls of the plate fin coil. The tubes are interconnected to form one or more heat exchange fluid circuits. Pairs of tubes are connected at one end by "hair pins" which are generally integral with the straight tubes they connect. Pairs of tubes at the opposite end of the coil are connected by return bends, these being U-shaped tubes compatible with the straight tubes which they connect. In operation, heat exchange fluid, such as a refrigerant, flows into an open end of a tube forming the beginning of a heat exchange tube circuit, proceeds through the circuit while heat is transferred between the fluid and the surroundings, and leaves the coil through another open tube forming the other end of the circuit.

The heat exchange tubes used in some plate fin coils are fabricated from aluminum because of the heat transfer and metallurgical characteristics of this material, and because of its low cost relative to other known heat conductors such as copper. Likewise, it has become conventional to fabricate the U-shaped return bends from aluminum tubing both because of the foregoing factors and because of the compatibility of aluminum return bends with aluminum straight tubes.

It is important that the return bends be connected to the respective straight tubes in a strong, fluid-tight manner to prevent refrigerant or other heat exchange fluid from leaving the heat exchange circuit through any juncture of a return bend and the tubes to which it is connected. Although it is known to attach aluminum return bends to aluminum straight tubes by means of various brazing and conventional soldering techniques, those techniques have inherent problems which are undesirable. Current methods for connecting aluminum return bends to aluminum tubes involve ultrasonic soldering processes. These processes are particularly advantageous for soldering aluminum materials together, because a major impediment to such operations is the presence of the aluminum oxide which forms on raw aluminum surfaces exposed to oxygen as exists in the ambient air. This oxide coating severly hampers the establishment of a good solder joint, and the ultrasonic soldering process has been found to scrub this oxide coating from the aluminum surfaces being bonded, to enable a good solder bond to be effected. U.S. Pat. No. 3,752,381 describes an ultrasonic soldering apparatus useful for performing the bonding operation described herein, and U.S. Pat. No. 3,760,481 describes an improved process for joining aluminum return bends to heat exchange tubes in plate fin coils. A common process for performing the ultrasonic soldering of aluminum return bends to aluminum heat exchange tubes in plate fin coils comprises the steps of prefitting the return bends into the bell-shaped open ends of the heat exchange tubes being connected, preheating the return bends and the heat exchange tubes in the region to be joined, immersing the prefitted return bends and the ends of the tubes into which they have been inserted into a molten solder bath to equalize the temperature across the area being soldered, applying ultrasonic energy to the molten solder to effect the bond, and withdrawing the plate fin coil from the solder bath to enable the solder to harden in the filled joint.

In performing the preceding operation, it is extremely important that the air pressure within the tubes and return bends be relieved while the assembly is immersed in the molten solder for, otherwise, the air pressure within the tubes and return bends would prevent the molten solder from flowing into the gap between the portion of the return bends inserted into the heat exchange tubes being joined, and the interior surfaces of those tubes opposite the inserted portions of the return bends. One procedure for venting the interior of a plate fin coil circuit to the atmosphere during the ultrasonic soldering process has involved providing copper venting tubes placed in the open ends of the respective circuits in the plate fin coil, these open ends being disposed at the same end of the coil as the return bends. A short extension tube or "stub out" is connected to the open ends of the aluminum heat exchange tubes, and a venting tube or "snorkel" is placed in the "stub out" with a fluid tight fit and configured such that its open end is exposed to the ambient air when the "stub out" is immersed in the molten solder bath. After the completion of the ultrasonic soldering process, the snorkel tube is removed from the "stub out."

Although the foregoing venting apparatus and process effectively relieves the pressure in the respective circuits during the ultrasonic soldering process, it does suffer serious shortcomings. These snorkel tubes are not reusable, and copper tubes are expensive items to discard. When the used copper snorkel tube is cut after the ultrasonic soldering process, copper chips occasionally are thrown onto the aluminum coil, and the presence of copper chips on the aluminum surface can result in electrolytic action between the two metals which may ultimately result in a leak in the aluminum tubes. Moreover, the time taken to bond the copper snorkel tube to the open aluminum tubes, and to subsequently cut those snorkel tubes after the soldering process, is very uneconomical, particularly in light of the high volume production of plate fin coils.

Another form of venting is disclosed in U.S. Pat. No. 4,076,167 wherein a process snorkel is employed; however, the process snorkel is heated to facilitate its removal which adds a further step in the manufacture of the heat exchange coil. U.S. Pat. No. 3,833,986 provides a vent opening in the upper portion of the heat exchange coil that must be closed which also adds a further step in the manufacture of the heat exchange coil.

SUMMARY OF THE INVENTION

An object of the present invention is to provide an improved process for relieving the pressure in the circuits of plate fin coils when portions of the coils are immersed in molten solder during an ultrasonic soldering process for bonding return bends to the heat exchange tubes of the coil.

Other objects will be apparent from the description to follow and from the appended claims.

The foregoing objects are achieved by the provision of a venting apparatus and method for relieving the pressure in the circuits of the plate fin coils during the ultrasonic soldering of aluminum return bends to aluminum heat exchange tubes in the coil. In the present system, a snorkel tube is provided that is arranged for movement relative to the carry mechanism that supports the heat exchange coil. The heat exchange coil is positioned on the carry mechanism so that the snorkel will move into the open end of the heat exchange circuit. The assembly, including the positioned snorkel, is then immersed in the solder bath. After the soldering process, the heat exchanger is removed from the solder bath at which time the snorkel is removed from its position in the open tube end and the heat exchanger is removed from the carry mechanism which is then ready to receive another heat exchanger for processing.

BRIEF DESCRIPTION OF THE DRAWINGS

FIG. 1 is a view of a typical heat exchanger utilizing the present invention;

FIG. 2 is a view illustrating a production line for practicing the present invention;

FIG. 3 is an enlarged elevational view showing the solder pot with the heat exchanger assembly immersed with the telescopic joints in the solder bath;

FIG. 4 is a view showing one step in the process for practicing the present invention;

FIG. 5 is a view showing another step in the process for practicing the present invention; and FIG. 6 is a view similar to FIG. 3 showing another embodiment of the invention.

DESCRIPTION OF THE PREFERRED EMBODIMENT

The invention is illustrated in connection with an aluminum tube-aluminum fin heat exchange coil 10 adapted for use in air conditioners. The condenser includes end plates 11 and 12 for supporting tubing which has been traditionally described as refrigerant coils and which is illustrated in a serpentine arrangement. The serpentine arrangement is provided by a plurality of relatively long, U-shaped tubular members, as at 14, 15 and 16, which are sometimes referred to as "hair pin" shaped. Open ends of the adjacent tubular "hair pin" shaped members are connected by shorter U-shaped tubular members, as at 18 and 20, the first of which connects one end of tubular member 14 with one end of tubular member 15, and the second of which connects the other end of tubular member 15 to one end of tubular member 16. The members 18 and 20 are sometimes referred to as return bends.

The longer tubular members, as at 14, 15 and 16, are supported on the end plates 11 and 12. The shorter return bends 18 and 20 are secured to the longer tubular members. Mounted on the longer tubular members 14, 15 and 16 are a plurality of relatively thin fins 22 which function as heat transfer members. The fins are closely spaced from each other, as by collars on the fins tightly fitted on the tubular members 14, 15 and 16. In a typical manufacturing process, the end plates and fins are stacked and the tubes 14, 15 and 16 are inserted in the plates 11 and 12 and the fins 22, following which the tubes are expanded sufficiently to form a tight fit in the stack. Afterwards, the return bends 18 and 20 are secured in place.

The ends of the tubes 14, 15 and 16 to which return bends are to be bonded are bell-shaped and have a first expanded portion 24 whose inner diameter is dimensioned to receive the end portions of return bends 18 and 20 in a telescoping manner, albeit by means of a press-fit, and a second expanded portion 26 having a larger inner diameter dimensioned to facilitate the flow of solder around the portion of a return bend inserted therein. The illustrated plate fin coil includes a single circuit, although it is common to incorporate many circuits in this type of heat exchanger coil. The circuit terminates in open ends 28 which include the bell-shaped configuration and form the entrance and exit parts for heat exchange fluid to flow through the circuit when the plate fin coil is connected in a refrigeration system. The coil assembly is partially immersed in a volume of molten solder 30 (FIGS. 2 and 3), such as zinc-aluminum solder, disposed in an ultrasonic soldering tank or bath 32. An appropriate ultrasonic generator for applying ultrasonic energy to the tank and appropriate heating means for maintaining the liquidity of the solder are also provided but are omitted from the drawings for the purpose of clarity.

When the return bends 18,20 are to be ultrasonically soldered to heat exchange tubes 14, 15 and 16, the plate fin coil 10 is immersed in molten solder bath 32 to an extent such that the level of molten solder 30 is above the telescoping portion of return bends 18,20 and the bell-shaped portion of tubes 14, 15 and 16, as indicated by the level 34 of solder 30 in tank 32. Such immersion effects an internal air pressure within the circuit formed by the tubes and return bends due to air entrapped therein unless provision is made for relieving that air pressure. In order to obtain such pressure relief, snorkels 36 are provided and applied as will be explained now in detail.

Typically, in an automatic assembly line used in the manufacture of aluminum heat exchange coils, the assembly, including the return bends 18 and 20, is arranged on a conveyor designated at 40. FIG. 2 shows the progression of several heat exchange coils as they move along the conveyor 40 and through the soldering process. A heat exchange coil assembly moves from a position "A" where it is arranged on a carrier 42 in a manner to be explained fully to a position "B" over the solder tank 32 at which time the conveyor is momentarily stopped or indexed. In this position, the solder tank 32 may be elevated or the carrier 42, including the coil 10 may be lowered so that the telescoped joints are immersed, as shown in Position "B" of FIG. 2. In the present instance, the solder tank 32 is raised and lowered by any convenient means designated at 43 relative to the coil to immerse the joints and complete the soldering process. At the same time, a heat exchange coil is being soldered. Another one shown at position "C" may be ready for removal from the conveyor 40 as well as explained hereinafter.

The heat exchange coil 10 is supported on the conveyor 40 and positioned relative to the solder tank by carrier 42 which supports clamping means 44. While it is necessary that means be employed for securing the heat exchanger relative to the conveyor and solder pot, the exact means for accomplishing this is not critical. One suitable means may employ a clamping means as shown in the present embodiment. The clamping means in this instance includes a pair of arms 46 and 48 for positioning and holding the heat exchange coil 10 relative to carrier 42. The snorkel 36 in this embodiment of the invention is also supported on the carrier 42.

The lower arm 48 is secured to the carrier 42 while the upper arm 46 is arranged on a ram mechanism 50 that, as will be now explained, moves relative to the carrier 42. In its normal or inoperative position the ram 50, including arm 46, is extended to its raised broken line position as shown in position "C" of FIG. 2. With the arm 46 in this position, the coil 10 is arranged on the lower arm 48, the ram 50 is then activated so that arm 46 engages the upper portion of the coil to hold it securely between arms 46 and 48, as shown in FIGS. 2-4, relative to the carrier 42. The snorkel in the present embodiment is supported on the carrier 42 and is mounted on a plate 52. The plate 52 is also arranged for movement relative to the carrier 42. The plate 52 has secured thereto one end of a plunger 54 which is actuated by a ram 56 mounted on the carrier 42. In its normal or inoperative position the ram 56, including plate 52 and snorkel 36, is in its extended or lowered position shown in position "C" of FIG. 2 and FIGS. 4 and 5. After the heat exchange coil 10 is securely positioned relative to the carrier 42, as explained above, the ram 56 is activated moving plate 52 toward carrier 42 so that the end 58 of snorkel 36 is arranged in the bell-shaped open end 28 of tube 14, as shown in FIG. 3. With the end 58 of snorkel 36 arranged in the open end 28, the heat exchange coil 10 is then immersed in the solder 30 contained in tank 32. In this position, the other end 60 of snorkel 36 communicates with the ambient air to provide the desired pressure relief, whereby the interior of the circuit is at ambient pressure and the problem associated with build-up of air pressure within the circuit is avoided. In the present embodiment shown, a single snorkel has been applied to one open end of the circuit to effectively relieve air pressure. It should be noted, however, that if desirable relative to a particular heat exchange coil design, a snorkel may be applied to all of the open ends of a circuit.

While the exact diameter of the snorkel end 58, relative to the inside diameter of the end portion 28 and its tubes is not critical, it is important that the diameter of the snorkel end 58 be smaller than the inner diameter of end portion 28 so that the circumferential radial clearance between them is sufficient to prevent an effective bridge of solder to form that would bond the snorkel to the end 28. Accordingly, the radial clearance between the snorkel is such that a thin layer of the solder, when present, is not sufficient to impair the removal of the snorkel from the tube. In the present instance, with a radial clearance of about 0.1" between the snorkel and the tube, the removal of the snorkel 36 caused by the retraction of ram 56 while the solder is molten was effective in breaking a film of solder when present. To further facilitate its removal, the snorkel is fabricated from a material, such as stainless steel, which is not compatible with the solder so that the adherence between the materials is very low.

In another embodiment of the invention, as shown in FIG. 6, the snorkel 36 is carried on and is movable with the solder bath 30. The position of the snorkel 36 in the solder tank is such that the end 58 will align with the open end 28 as the tank 32 and heat exchange coil 10 meet in the same relative position shown in the embodiment of FIG. 3. The snorkel would still be fabricated from a material that is not compatible with solder to prevent solder build-up on the snorkel, thus allowing its reuse over an extended period of time.

The use of a snorkel having a diameter substantially less than the inner diameter of the tube allows greater tolerance in locating the snorkel relative to the tube and also allows the inner surface of the tube to be pretinned. This pretinning of the tube is advantageous in the connection of other tube members thereto.

It should be apparent to those skilled in the art that the embodiment described heretofore is considered to be the presently preferred form of this invention. In accordance with the Patent Statutes, changes may be made in the disclosed method and the manner in which it is used without actually departing from the true spirit and scope of this invention.

What is claimed is:

1. The method of relieving the interior air pressure of a heat exchanger fluid circuit of a heat exchanger coil during a soldering operation, the circuit including a plurality of heat exchange tubes having open ends connected by return bends prefitted into the open ends and the circuit terminating in open-ended tubular members having an inner surface wherein the return bends are immersed in a bath of molten solder, the method comprising the steps of:

arranging the heat exchanger coil on a conveyor means;

providing a snorkel tube having one end dimensioned to be inserted in one of said open-ended tubular members;

inserting said one end of said snorkel tube in said one open-ended tubular member, the inserted end of the snorkel tube having an outer diameter smaller than the inside diameter of said one open-ended tubular member so that a circumferential space is provided between the inserted end of said snorkel tube and the inner surface of said one open-ended tubular member and maintaining said circumferential space between an inserted length of said snorkel tube and the inner surface of said one open-ended tubular member sufficient to prevent solder from bridging the space to form a bond between said snorkel tube and said inner surface of said one open-ended tubular member;

immersing the portion of the heat exchanger coil having the open ends of the heat exchange tubes with the prefitted return bends and said one open-ended tubular member with said snorkel tube end into the solder bath with the other end of the snorkel tube communicating with the atmosphere, relieving the internal pressure in the circuit, thereby enabling the molten solder to flow into the joints between heat exchange tubes and the return bends while continuing to maintain said circumferential space;

removing the immersed portion of the heat exchanger coil from the solder bath;

moving said snorkel tube relative to said one open-ended tubular member so that said one end of said snorkel tube is removed from said one open-ended tubular member; and removing said heat exchanger coil from said conveyor means.

2. The method, as defined in claim 1, wherein said conveyor means includes a snorkel tube moving means for positioning the snorkel tube relative to said heat exchanger coil.

3. The method, as defined in claim 2, including the step of moving said snorkel tube moving means relative to said heat exchanger coil for positioning said one end of said snorkel tube in said one open-ended tubular member.

4. The method, as defined in claim 1, including the step of preheating the heat exchanger coil in at least the area to be immersed to a temperature on the order of that of the molten solder before immersing.

5. The method, as defined in claim 4, wherein the solder bath is moved to position the heat exchanger coil in the solder bath.

6. The method, as defined in claim 5, wherein the heat exchange tubes are aluminum and the snorkel tube is stainless steel.

7. The method, as defined in claim 6, including the step of introducing ultrasonic vibrations into the solder while the heat exchanger coil is immersed.

8. The method, as defined in claim 1, wherein said snorkel tube is immersed in said solder bath so that said one end of said snorkel tube is positioned in said one open-ended tubular member when said heat exchanger coil is immersed in said solder bath.

* * * * *